United States Patent [19]
Leonard et al.

[11] Patent Number: 5,586,510
[45] Date of Patent: Dec. 24, 1996

[54] METHOD AND SYSTEM FOR CONTROLLING POLLUTANT EMISSIONS IN COMBUSTION OPERATIONS

[75] Inventors: R. Leon Leonard, Sacramento; Earl F. Bouse, Walnut Creek; Anne T. McQueen, Huntington Beach, all of Calif.

[73] Assignee: Cement Industry Environment Consortium, Riverside, Calif.

[21] Appl. No.: 213,718

[22] Filed: Mar. 16, 1994

[51] Int. Cl.$^6$ .................................................. F23J 11/00
[52] U.S. Cl. ............................ 110/345; 110/238; 110/344; 110/215; 422/168
[58] Field of Search ...................... 110/347, 344, 110/345, 215, 238, 246; 422/168; 432/14, 106; 423/358, DIG. 17, DIG. 18

[56] References Cited

U.S. PATENT DOCUMENTS

| | | |
|---|---|---|
| 4,306,978 | 12/1981 | Wurtz . |
| 4,640,681 | 2/1987 | Steinbiss et al. . |
| 4,761,182 | 8/1988 | Whitescarver et al. . |
| 4,921,538 | 5/1990 | Lafser, Jr. et al. . |
| 4,984,983 | 1/1991 | Enkegaard . |
| 5,037,561 | 8/1991 | Copeland . |
| 5,058,514 | 10/1991 | Mozes et al. . |
| 5,123,363 | 6/1992 | Martin . |
| 5,176,088 | 1/1993 | Amrhein et al. . |
| 5,217,624 | 6/1993 | Yamane et al. . |
| 5,257,588 | 11/1993 | Kollmann ............................ 110/345 |
| 5,315,941 | 5/1994 | Vetterick et al. . |

FOREIGN PATENT DOCUMENTS

3545317A1  6/1987  Germany .

Primary Examiner—Denise L. Gromada
Attorney, Agent, or Firm—Klauber & Jackson

[57] ABSTRACT

The present invention relates to methods and systems for reducing pollutant emissions associated with combustion operations, e.g., cement manufacturing. The invention further relates to the disposal of sludge, e.g., produced by waste water treatment plants, by introducing it into the combustion process. In particular, the invention provides for introducing particles of aqueous sludge into a kiln at a point in the kiln effective to reduce pollutant emissions in outlet flue gasses produced by the kiln. Optimally, the sludge is introduced at a point in which maximum $NO_x$ emission reductions can occur and maximum HCl emission reductions can occur downstream (at lower temperatures). In a specific embodiment, introduction of about 10 to about 20 tons per hour of wet sludge results in about a 15% to 30% reduction in $NO_x$ emissions in a cement kiln.

20 Claims, 8 Drawing Sheets

FIG. I
PRIOR ART

FIG. 4
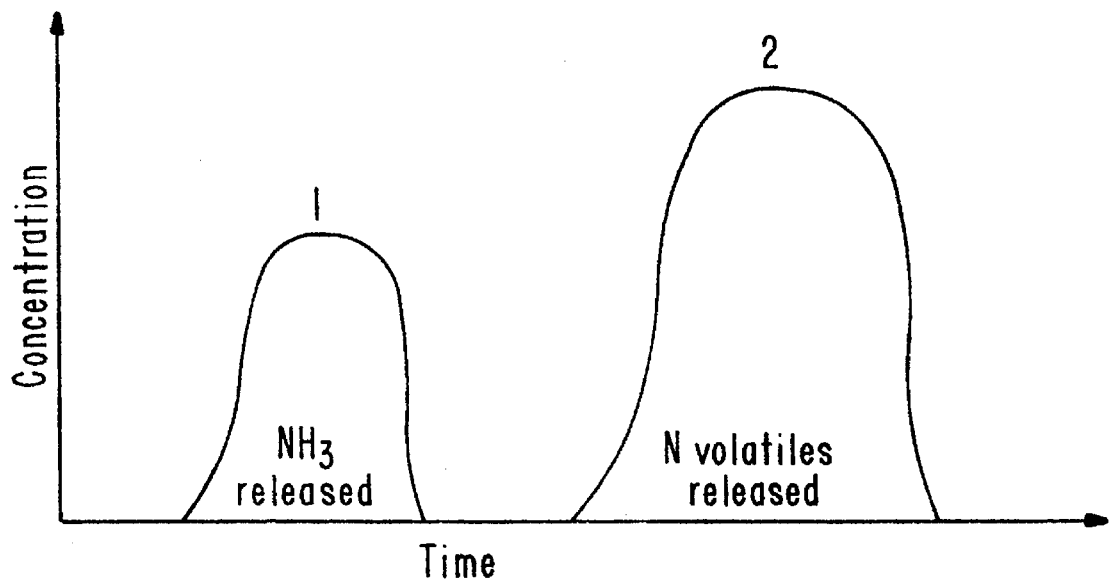
Step 1 - NH₃ released
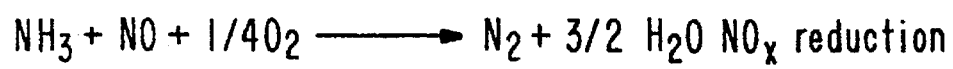
Step 2 - N volatiles released
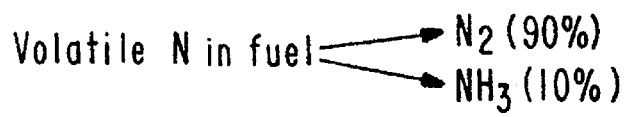
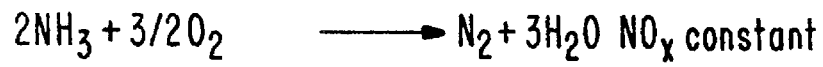
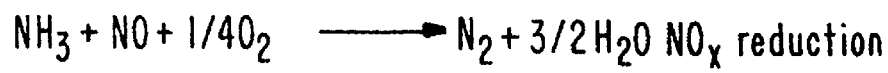

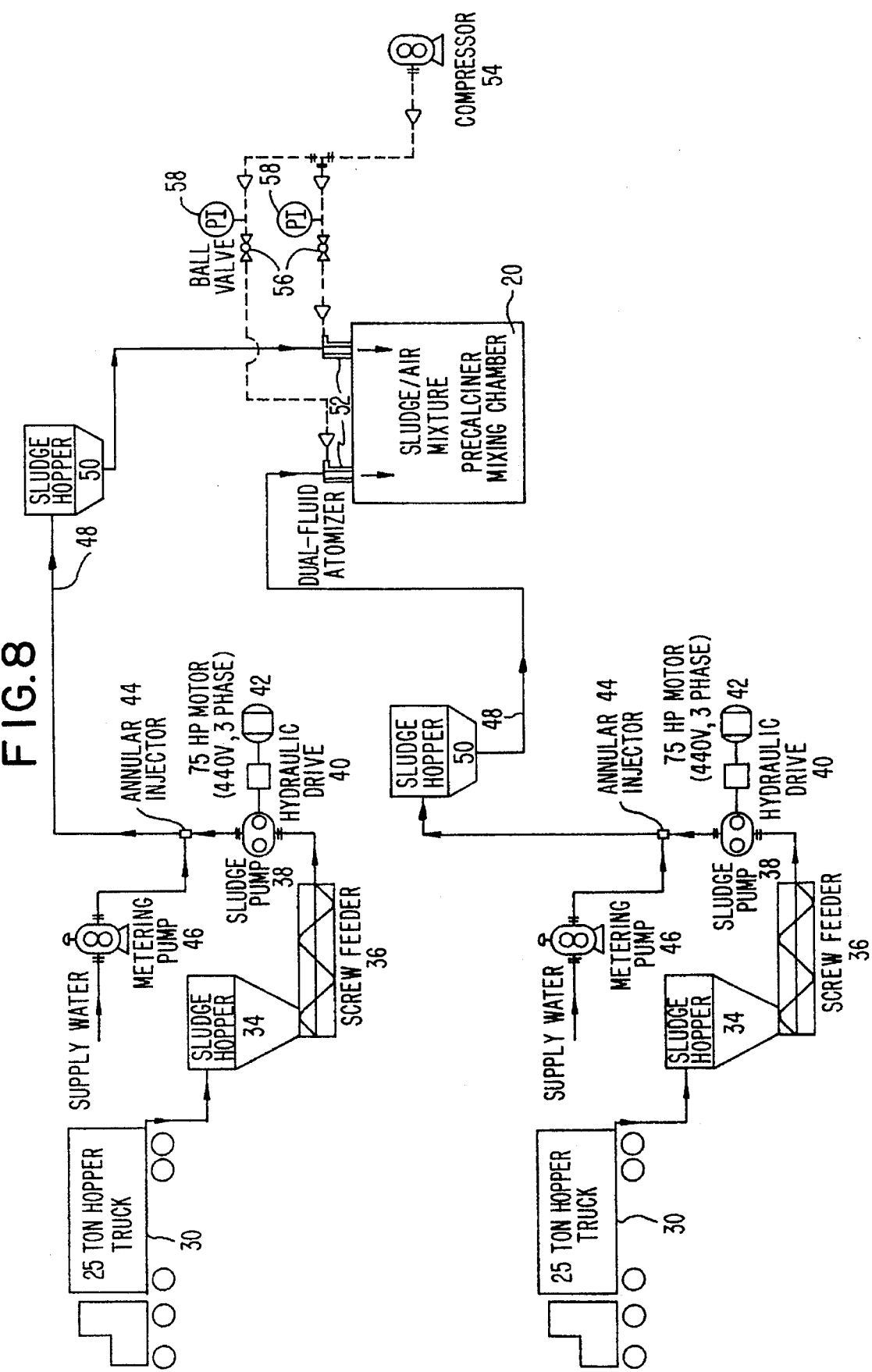

METHOD AND SYSTEM FOR CONTROLLING POLLUTANT EMISSIONS IN COMBUSTION OPERATIONS

FIELD OF THE INVENTION

The present invention relates to methods and systems for reducing pollutant emissions associated with combustion operations, such as cement production. The invention further relates to the disposal of biological sludge, e.g., produced by waste water treatment plants, by introducing it into the combustion operation.

BACKGROUND OF THE INVENTION

Oxides of nitrogen are one of the principal contaminants emitted by combustion processes, and various combustion processes are known to generate effluent gases having an unacceptably high $NO_x$ content. In every combustion process, the high temperatures at the burner thus results in the fixation of some oxides of nitrogen. These compounds are found in stack gases mainly as nitric oxide (NO) with lesser amounts of nitrogen dioxide ($NO_2$) and only traces of other oxides, such as $N_2O$. Since nitric oxide (NO) continues to oxidize to nitrogen dioxide ($NO_2$) in the air at ordinary temperatures, there is no way to predict with accuracy the amounts of each separately in vented gases at a given time. Thus, the total amount of nitric oxide (NO) plus nitrogen dioxide ($NO_2$) and $N_2O$ in a sample is determined and referred to as "oxides of nitrogen ($NO_x$)".

Production of hydrogen chloride (HCl) is another undesirable side effect of combustion operations. Upon contacting water in the atmosphere, HCl forms hydrochloric acid, which contributes, as does $NO_x$, to the acid rain problem.

The production of cement is a relatively complex process that involves mining and milling the raw materials, which are then fed directly into a kiln, or fed initially into a heat exchanger (typically a preheater or precalciner) which discharges the material into a kiln, and fired to produce "clinkers". The clinkers are subsequently milled and packaged for sale as cement. This prior art process is schematically illustrated in FIG. 1.

Cement kiln operations are among the combustion processes known to involve production of substantial quantities of undesirable $NO_x$ and HCl. $NO_x$ emission can be decreased by introducing a selective reducing agent, such as ammonia, into the combustion mixture.

With the technology currently available, reduction of HCl emissions requires the use of a wet scrubber. Wet scrubbers increase the complexity of a combustion process, and greatly increase the cost of combustion operations.

Various modifications of kiln operations have been attempted to reduce the level of emissions of pollutants, and to take advantage of the combustion process to incinerate undesirable waste as well. In particular, waste water treatment plant sludge (i.e., biological sludge) has been used as a feed material in cement kiln operations, which in turn eliminates the sludge.

For example, Yamane et al., (U.S. Pat. No. 5,217,624, issued Jun. 8, 1993) describes a process for introducing waste treatment sludge into a cement kiln, and introducing gases generated during processing of the sludge into the kiln as well in order to reduce $NO_x$ content of the exhaust gas. Yamane et al. specifically describes a process of mixing sludge with quicklime to produce slaked lime and sewage sludge. The mixture is dehydrated, releasing gases including ammonia. The remaining solids are introduced into a cement kiln, where the lime and inorganic substances become raw materials for cement, and the organic substances become fuel for cement burning. Dust and water vapor present in the gases produced during dehydration are removed by filtration and distillation, respectively, allowing introduction of the gas containing ammonia into the kiln. The gas containing ammonia helps reduce $NO_x$ emissions.

Lafser, Jr. et al. (U.S. Pat. No. 4,921,538, issued May 1, 1990) concerns a method for recycling and reusing contaminated earth and mineral matter in the manufacture of cement clinkers. The contaminated material is mixed with inorganic constituents in water to form a raw material slurry suitable for manufacture of Portland cement, and is then charged to a cement kiln.

Wuntz (U.S. Pat. No. 4,306,978, issued Dec. 22, 1981) concerns a method for lime stabilization of waste water sludge. The sludge is dewatered to produce a sludge cake having 10 to 60% solids and this is then mixed with calcium oxide to produce stabilized sludge pellets.

Steinbiss et al. (U.S. Pat. No. 4,640,681, issued Feb. 3, 1987) concerns a method and apparatus for removal of hazardous and waste materials of low heat content, such as refuse. Among the wastes considered are "household wastes, agricultural waste and industrial waste."

Enkegaard (U.S. Pat. No. 4,984,983, issued Jan. 15, 1991) concerns a method and apparatus for co-firing hazardous organic waste in solid pasty, greasy or sludge form by introducing it directly into the burning zone of an industrial rotary kiln and burning the waste in such zone simultaneously with cement kiln or lightweight aggregate. In particular, the waste is gasified prior to injecting the gas into the kiln. The gasification may be accomplished in a conventional gasifier such as is used for coal gasification.

Mozes et al. (U.S. Pat. No. 5,058,514, issued Oct. 27, 1991) describes a method for the simultaneous control of sulfur dioxide and $NO_x$ emissions from power plant flue gases. In the method described, an aqueous slurry of limestone and a nitrogenous progenitor such as urea is injected into the furnace at temperatures ranging between 900° C. and 1350° C.

Somewhat similar to the above, Amrhein et al. (U.S. Pat. No. 5,176,088, issued Jan. 5, 1993) discloses, among other things, the injection of ammonia into a furnace region having a temperature of about 1600° to 2000° F., to reduce $NO_x$.

There is, therefore, a need in the art to reduce pollutant emissions produced during combustion processes, such as cement kiln operations. In particular, there is a need to reduce $NO_x$ emissions.

There is also a need in the art to reduce HCl emissions produced during combustion processes, particularly cement kiln operations.

There is a further need in the art to utilize and eliminate sewage sludge.

Another need in the art is to provide for an efficient and cost effective means for achieving both of these ends.

These and other needs in the art are addressed by the present invention, as described below.

SUMMARY OF THE INVENTION

The present invention is directed to a method for eliminating sludge by introducing aqueous (wet) sludge into the combustion mixture during a combustion operation in order to reduce emissions of undesirable pollutants, in particular $NO_x$ and HCl. The invention provides for introducing particles of aqueous sludge into a combustion operation in an amount and at a point in the combustion operation effective to reduce $NO_x$, and in some instances, HCl, emissions in outlet flue gasses produced by the combustion operation. Preferably, an amount of sludge effective for optimal reduction in $NO_x$ and HCl emissions is introduced into the combustion operation at a point in which maximum pollutant, e.g., $NO_x$ and HCl, emission reduction can occur. Generally, an optimal point for introduction in the combustion operation is in the outlet flue gases where the temperature is between about 1500° F. to about 1800° F. In a specific aspect in which the sludge is introduced in a combustion operation comprising a kiln and a precalciner, such as in a cement kiln operation, the sludge is introduced at a point downstream of the precalciner combustion zone where the kiln outlet flue gases and precalciner flue gases are mixed.

Sludge particles can be formed by introducing aqueous sludge through an appropriately sized aperture under pressure, using atomizing air, such that a sufficient amount of sludge is introduced to effect a reduction in $NO_x$ emissions. Atomizer design and atomizer pressure, particularly air pressure, can be varied after determining the optimum amount of sludge to be introduced in order to produce an optimum particle size. Optimal particle size will be reflected by improved kiln performance and greater reductions in pollutant emissions, or other performance parameters desired for the kiln operation. The particles of sludge are typically not larger than approximately 25 mm, but this may vary with sludge from various sources and moisture content, and is not critical.

In a further aspect of the invention, the aqueous sludge is introduced at a point in the combustion operation in which the temperature is approximately 1500° F. to approximately 1800° F.; preferably, the temperature is approximately 1700° F.

According to the invention, the sludge that is introduced into the combustion operation contains a sufficient amount of moisture to be readily transported to and introduced into the combustion process, e.g., a kiln, in particle form. Preferably, the moisture (water) content is not excessive, as this will excessively increase the amount of steam produced and thus the volume of stack gases. The sludge can typically comprise up to about 80% to about 85% water by weight, and cannot comprise less than about 65% to about 70% water. Preferably, the sludge comprises from about 70% to about 80% water by weight. The optimal water concentration of the sludge is readily achieved by mechanical dewatering operations, e.g., centrifuges and belt presses, typically produced and disposed of by sanitation districts. These dewatering operations do not significantly affect the ammonia content of the wet sludge.

If the sludge delivered to the site of the combustion operation is outside the appropriate moisture range, the invention contemplates reducing or increasing water content to compensate. For example, if the moisture content of the sludge is too high, partial reduction in water content, e.g., by mechanical dewatering or evaporation, although enough moisture remains even after reducing the water content to allow for pumping of the sludge and direct introduction into a kiln. If the water content is too low, water can be added to the sludge. Since drying is expensive, it is unlikely that sludge that is too dry will be provided.

The present invention advantageously provides for maximum introduction of ammonia contained in wet sludge. Most of the ammonia which is present in the wet sludge is dissolved in the adherent aqueous phase. Ammonia is also released from the particles of sludge that are wet and that enter at the desired point. Thus, the invention advantageously provides greater economy and efficiency in reducing pollutant emissions.

Introduction of aqueous sludge in the combustion operation is a significant advantage. Sludge typically contains more than b 85% water, and according to the prior art, substantially all of the water is required to be removed from the sludge before the solid materials are introduced into the cement kiln. Mechanical dewatering can bring the moisture content to about 70–80% water. However, removal of water below 70% moisture, especially when drying is required, dramatically increases the expense and complexity of sludge disposal.

In another aspect, the invention provides a combustion operation apparatus, such as a kiln, comprising means for introducing aqueous particles of sludge into the combustion operation apparatus. Such means preferably comprises means for generating particles of sludge of the desired size, e.g., an atomization system. Thus, the means for introducing aqueous particles of sludge into the combustion operation requires apparatus not normally associated with usual combustion operations, such as a prior art cement kiln as depicted in FIG. 1. Such combustion operation apparatus further comprises means and machinery typically associated with the combustion operation, e.g., cement production.

Thus, it is a principal object of the present invention to provide for reduction of pollutant emissions in kiln outlet flue gasses efficiently and economically, using specialty equipment modified for this purpose.

A particular object of the invention is the reduction of $NO_x$ emissions.

Another particular object of the invention is the reduction of emissions that cause acid rain.

Yet another particular object of the invention is the reduction of HCl emissions.

A further object of the invention is to provide for elimination of sludge waste material.

It is a further object of the invention to provide for introduction of aqueous sludge into a cement kiln.

Yet another object of the invention is to reduce $NO_x$ emission on the order of 15–30% or more.

These and other objects of the present invention will be further understood by reference to the following drawings and detailed description.

BRIEF DESCRIPTION OF THE DRAWINGS

FIG. 4 presents a schematic diagram of the fate of sewage sludge nitrogen after introduction into the kiln. The steps in FIG. 4 relate to the steps in FIG. 3.

FIG. 8 presents a schematic diagram for a sludge handling and feeding system for use in the method and apparatus of the invention.

DETAILED DESCRIPTION OF THE INVENTION

Figure 1:
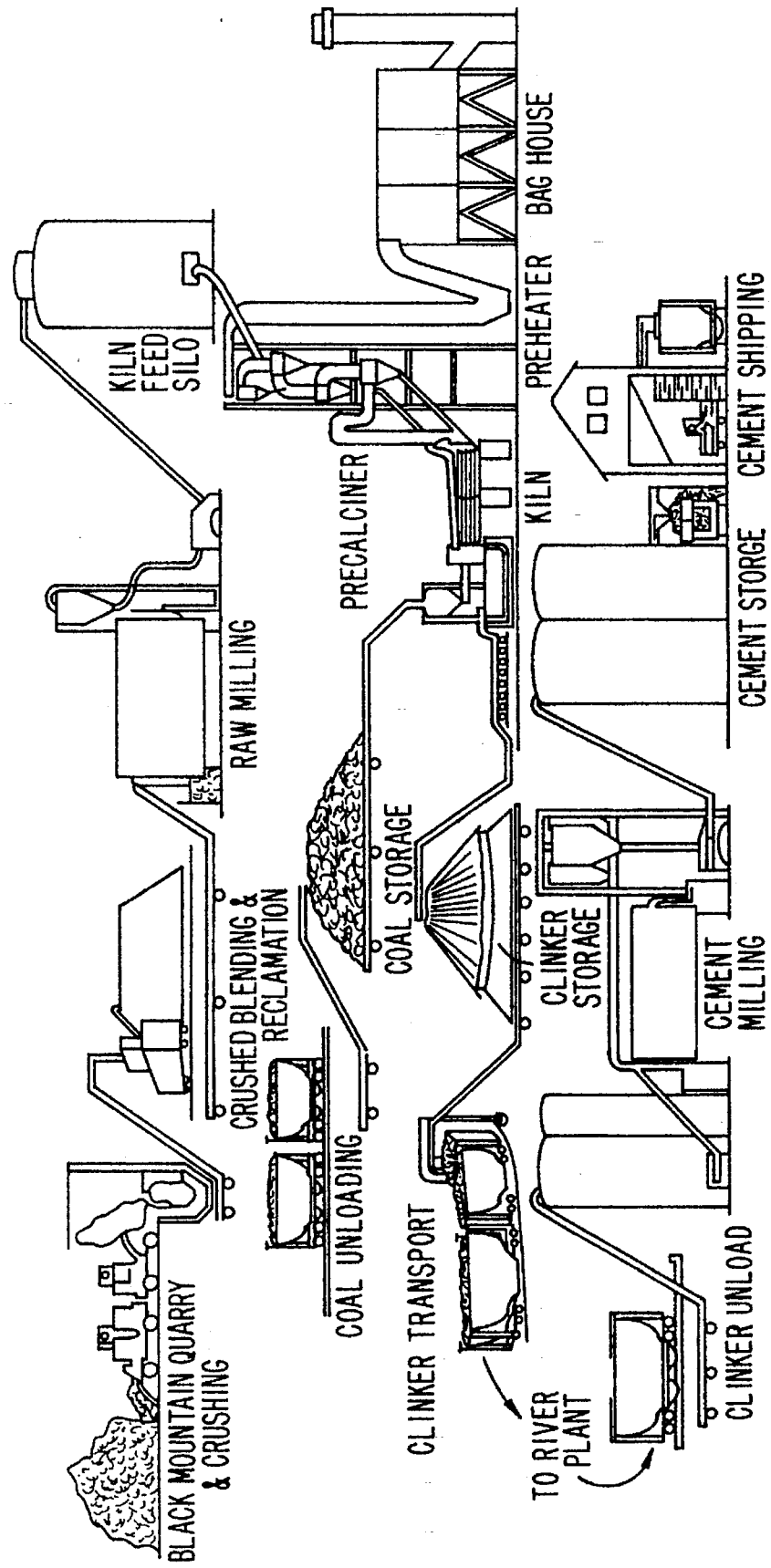
FIG. 1 is a prior art schematic diagram of a typical prior art cement manufacturing operation, from quarrying and crushing the raw materials, milling, and feeding into the kiln for clinker production, to clinker transport, milling, and shipping of the finished product.

A principal object of the invention is to introduce aqueous sludge at a point in a combustion operation processing stream where it will be effective to reduce pollutant levels in the outlet gases of the combustion operation. In particular, the invention is directed to a method and an apparatus for reducing $NO_x$ and HCl production in a kiln, in particular, a cement kiln.

As used herein, the term "kiln" is intended to refer generally to a combustion operation apparatus used in combustion operations or processing in the manufacture of materials or the production of energy. Thus, the term "kiln" as used throughout this application, unless otherwise indicated, refers to any such combustion operation apparatus.

Preferably the combustion operation involves a kiln. In a specific embodiment, the invention provides for introduction of aqueous sludge in a cement kiln used in the production of portland cement clinkers. It is readily appreciated that portland cement is a hydraulic cement produced by numerous cement manufacturers. In addition to kilns used for cement production, the invention specifically contemplates introducing sludge in kilns, particularly rotary kilns, used in the production or manufacture of lime, bricks, minerals, paper, etc. The term "kiln" further encompasses long dry kilns, kilns associated with boilers, preheater kilns, precalciner kilns, wet kilns, and the like. The invention further extends but is not limited to combustion processes in metal manufacturing, glass manufacturing, and energy production, e.g., combustion of coal to produce electricity.

The present invention provides for introduction of aqueous sludge into the kiln processing stream in which the ratio of ammonia ($NH_3$) to non-ammonia nitrogen is sufficient to provide for $NO_x$ reduction. Although not intending to be bound by any particular theory of the mechanism of $NO_x$ emission reduction, it is believed that a decrease in $NO_x$ emissions following introduction of aqueous sludge into a combustion operation involves selective reduction of $NO_x$ by $NH_3$. Accordingly, the process of the present invention does not require the overall $O_2$/fuel ratio to become fuel rich (stoichiometric air). Some $NO_x$ reduction, and inhibition of N volatile conversion to $NO_x$, can also result from local reducing zones produced by sludge combustion. The selective reduction mechanism proposed herein explains why larger quantities of sludge, which would lead to high CO emissions, are not required to achieve the same level of pollutant emission reduction. Thus, the quantity of sludge used according to the present invention is advantageously lower than that typically used when dried sludge is used as a fuel. Furthermore, according to the invention, ammonia release accompanies drying and precedes nitrogen volatiles release of the sludge introduced into the kiln processing stream.

In a further embodiment, the introduction of sludge can result in introduction of $NH_3$ that may not react with and reduce $NO_x$. Instead, this unreacted $NH_3$ "slip" can react with and neutralize HCl to form $NH_4Cl$ salts further downstream in the flue outlet, e.g., at temperatures of about 700° F. or less. In cement kiln operations, this reaction will generally occur upstream of or in the baghouse. However, according to the invention, most of the $NH_3$ reacts to reduce $NO_x$, rather than escapes as slip, which would result in plume formation.

The sludge is introduced into the kiln in particles, in which particle size range is selected to meet the requirements of particle carryover, particle drying time, and particle penetration necessary to accomplish the drying, ammonia release and ultimately combustion of the sludge. Particle size is preferably an operational parameter determined by the effects on combustion operation. Particle size may be varied by varying the atomizer type and atomization air pressure, while maintaining the amount of sludge to be introduced.

The following factors are considered in determining the optimum rate of introduction of the sludge, particle size of the sludge, and other factors for designing kilns according to the present invention. The size, type, fuel consumption and operating temperature of the kiln are very important. The concentration of oxygen, $NO_x$, CO, and HCl in the kiln gas outlet and precalciner gas outlet in the absence of sludge are important. Also critical are gas temperatures at the site of introduction, e.g., the mixing chamber or the precalciner. Another critical factor in designing systems of the invention is the content of ammonia, non-ammonia nitrogen, moisture and BTUs in the sludge. Once these factors are determined, a sludge injection rate can be determined to provide conditions in the kiln gas outlet sufficient to achieve potential $NO_x$ reductions of as much as 30% (i.e., $NH_3/NO_x$ molar ratio of approximately 0.3). The sludge injection rate is also preferably determined with respect to providing a small amount of $NH_3$ slip to react with and neutralize hydrogen chloride to form ammonium chloride salt, while avoiding plume formation.

In a particular aspect of the invention, an injection rate of about 5000 to about 10,000 lbs of sludge per hour, calculated on a dry weight basis (corresponding to approximately 10–20 tons per hour wet, in which the water content is about 75%), is expected to achieve $NO_x$ reductions of about 15% to about 30% in a cement kiln having the parameters shown in Table 1. Higher injection rates may further lead to higher $NO_x$ reduction levels.

TABLE 1

| | KILN PARAMETERS | | | |
|---|---|---|---|---|
| Parameter | Units | Kiln | Precal-ciner | Total |
| Feed rate | TPH | — | — | 280 |
| Clinker rate | TPH | — | — | 180 |
| Coal consumed | TPH | 10.0 | 12.2 | 22.2 |

TABLE 1-continued

| KILN PARAMETERS | | | | | |
|---|---|---|---|---|---|
| Tires consumed | TPH | 0.0 | 0.0 | 0.0 | |
| Energy consumed | MMBTU/hr | 249 | 305 | 554 | |
| Energy consumed | MMBTU/ton cl. | — | — | 3.1 | |

| Parameter | Units | Kiln Gas Outlet | Precalciner Gas Outlet | Stack |
|---|---|---|---|---|
| Flue gas | lb/hr dry | 306,500 | 782,700 | 1,211,300 |
| | DSCFM | 64,500 | 155,200 | 250,400 |
| | WACFM | 234,900 | 664,500 | 419,200 |
| | lb/hr wet | 316,400 | 804,900 | 1,233,500 |
| $CO_2$ | vol % dry | 14.0 | 26.3 | 16.3 |
| $O_2$ | vol % dry | 4.7 | 3.2 | 10.0 |
| $N_2$ | vol % dry | 81.3 | 70.5 | 73.7 |
| $H_2O$ | vol % | 5.2 | 4.8 | 3.0 |
| $NO_x$ | ppmvd actual | 687 | 594 | 333 |
| | lb/hr | 318 | 659 | 659 |
| | lb/MMBTU | 1.3 | 1.2 | 1.2 |
| | lb/ton clinker | 1.8 | 3.7 | 3.7 |
| Gas temperature | °F. | 2100 | 1600 | 400 |
| Gas velocity | ft/s | — | 60 | — |
| Gas length | ft | — | 48 | — |
| Gas residence time | s | — | 0.8 | — |

According to the present invention, the potential for $NO_x$ reduction of in the kiln outlet gases is preferably greater than about 30%. The principal assumptions in determining this value are the content of ammonia present in the wet sludge that is released with water upon introduction of the particles of sludge into the kiln and the baseline $NO_x$ emissions in the absence of sludge. Furthermore, it is believed that the dried sludge volatile nitrogen conversion to $NO_x$ is minimized by appropriate selection of the injection location and the foregoing parameters.

As used herein, the following terms have the given meanings:

The term "pollutant" refers to a component of combustion exhaust gases that has harmful or noxious properties. The present invention provides for reduction pollutant emissions. More particularly, the term "pollutant" refers to compounds that can react in the atmosphere to form acids and contribute to ambient ozone formation. In specific aspects, the term pollutants refers to $NO_x$ and HCl.

The term "aqueous sludge" generally refers to biosolids suspended or admixed in water, such as aqueous sewage produced by waste water treatment plants. It is a particular advantage of the present invention that it provides for the efficient and economical disposal of sewage sludge by using it to make cement. However, the invention contemplates use of aqueous organic solids or biosolids other than sewage sludge.

According to the invention, the sludge comprises between about 0.4% and about 1.5% ammonia by weight, calculated on a dry basis as nitrogen. The ratio of non-ammonia to ammonia nitrogen by weight is approximately 1.5 to approximately 12.0. Additional components of sludge include but are not limited to carbon, hydrogen, oxygen, sulfur and other elements. Sludge comprises volatile components as well as solids which upon combustion produce ash. The sludge for use according to the present invention advantageously contains water, thus eliminating the step of dehydration that is necessary according to prior art methods for combustion of sludge.

Generally, the water content of the sludge that is introduced into the combustion operation ranges from about 65–70% up to about 80–85%, by weight. Preferably, the moisture content is about 70% to about 80% water, by weight. In a specific embodiment, the moisture content is approximately 75%. If the water content is too high, the evaporation of water will lead to overall cooling that can adversely affect the combustion operation or limit the potential reduction in pollutant emissions. If the water content is too low, it may not be possible to introduce particles of sludge into the combustion operation. Parameters of a specific example of a sludge sample are shown in Table 2.

TABLE 2

| | | SLUDGE PARAMETERS | | | | |
|---|---|---|---|---|---|---|
| Parameter | Units | Hyp. Data Dry Sludge | Hyp. Data Wet Sludge | Minimum | Average | Maximum |
| Solids content | % solids | — | 22 | 30 | 25 | 22 |
| Water content | % moisture | — | 78 | 70 | 75 | 78 |
| | lb/lb dry solids | — | 3.5 | 2.3 | 3.0 | 3.5 |
| BTU content | BTU/lb dry solids | 4,590 | | | 4,500 | |
| | BTU/lb volatiles | 11,000 | | | 12,000 | |
| C | wt %, dry | 24.1 | | | 24.1 | |
| H | wt %, dry | 3.9 | | | 3.8 | |
| O | wt %, dry | 10.4 | | | 10.4 | |
| S | wt %, dry | 1.2 | | | 1.2 | |
| Total volatiles | wt %, dry | 43.2 | | | 43.2 | |
| Ash | wt %, dry | 56.8 | | | 56.8 | |
| Wet Sludge Values | | | | | | |
| $NH_3$ | wt %, dry | — | 1.02 | 0.4 | 0.8 | 1.5 |
| $NH_3N$ | wt %, dry | — | 0.84 | 0.33 | 0.86 | 0.82 |
| non-$NH_3N$ | wt %, dry | 2.7* | 4.16 | 2.0 | 4.0 | 7.5 |
| Total N | wt %, dry | — | 5.00 | 2.3 | 4.7 | 8.3 |

*Dry sludge value for Total N based on ultimate analysis.

According to the invention, the water content of the sludge is only important when the sludge is introduced into the combustion operation. In most cases, no additional processing of the sludge prior to introduction into the combustion operation is required. Nevertheless, the present invention contemplates adjusting the water content of sludge that may have too high or too low a water content, although as a practical matter, neither possibility is likely. This is because sludge of a high water content is expensive to transport, since much of the material is water. Sludge of a low water content is more expensive, since drying requires space for drying ponds and time. Thus, there is no incentive to produce sludge that is too dry for use according to the invention. Nevertheless, the invention provides for reducing, but not eliminating, the moisture content of the sludge that contains too much water, e.g., by mechanical dewatering (with a belt press or centrifuge) or evaporation, so as to reduce the amount of steam produced on combustion of the sludge. The invention further provides for adding water to sludge with too low a moisture content.

It will be further recognized that the sludge itself also acts as a fuel. That is, the sludge has energy content, which can be represented in BTUs. For example, the energy content per pound of dry solids in the sludge is on the order of about 4500 to about 6500 BTU; the energy content of volatiles present in the sludge is on the order of approximately 12,000. Consequently, introduction of sludge in the combustion operation results in a small net decrease in energy consumption. This net decrease in energy consumption is partly offset by the moisture content of the sludge, but the net BTU content of the aqueous sludge is positive (with net fuel savings) at the moisture content of the sludge according to the present invention.

As used herein, the term "atomization system" refers to an apparatus or means for generating particles of defined size from the sludge. For example, the atomization system may be a dual-fluid atomization system in which steam or air forces the aqueous sludge through an atomizer in such a way as to generate particles of sludge or a gunnite nozzle under pressure. In specific embodiments, particles ranging in size from approximately 5 millimeters to approximately 25 millimeters can be generated. However, the actual particle size need not be determined, or necessarily fall within this range if it is determined. The critical point is that the atomization system produces particles of sludge that, upon introduction into the combustion operation, result in a decrease in pollutant emissions.

Figure 2:
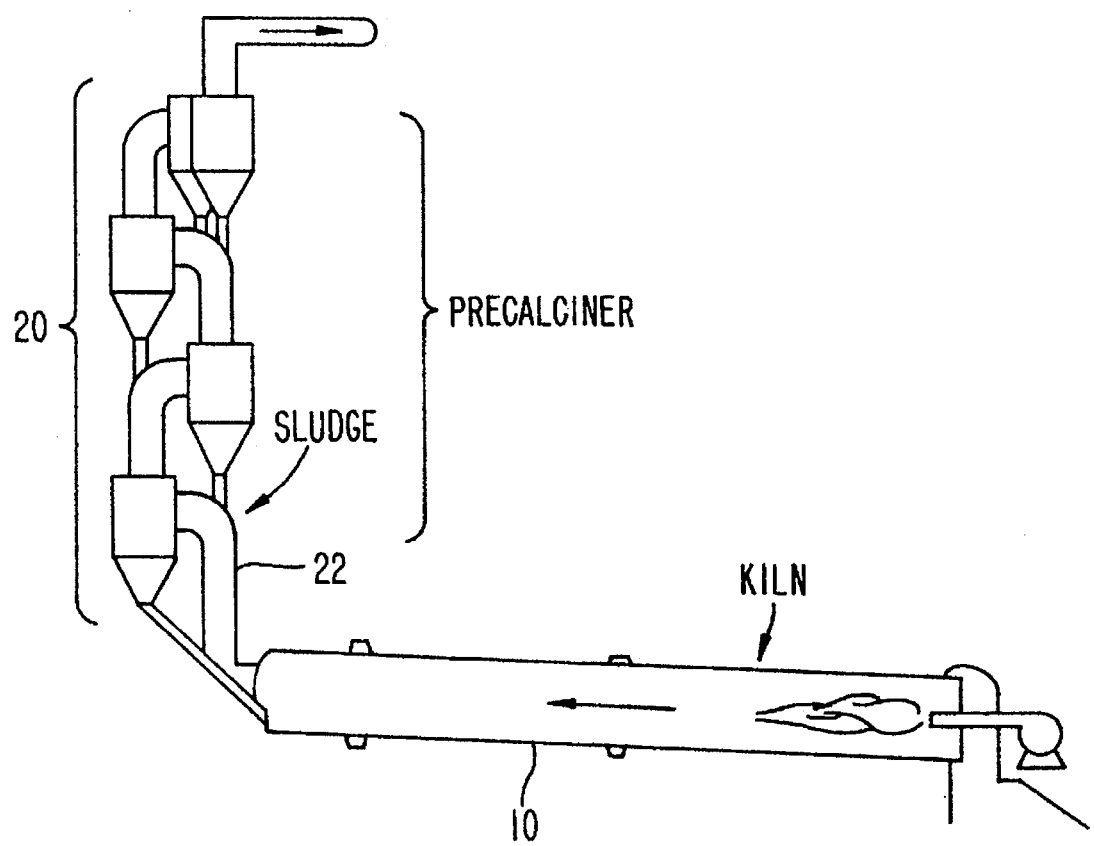
FIG. 2 presents a schematic diagram of a precalciner and cement kiln. A preferred site for introduction of aqueous sludge according to the invention is shown by the arrow.
Figure 3:
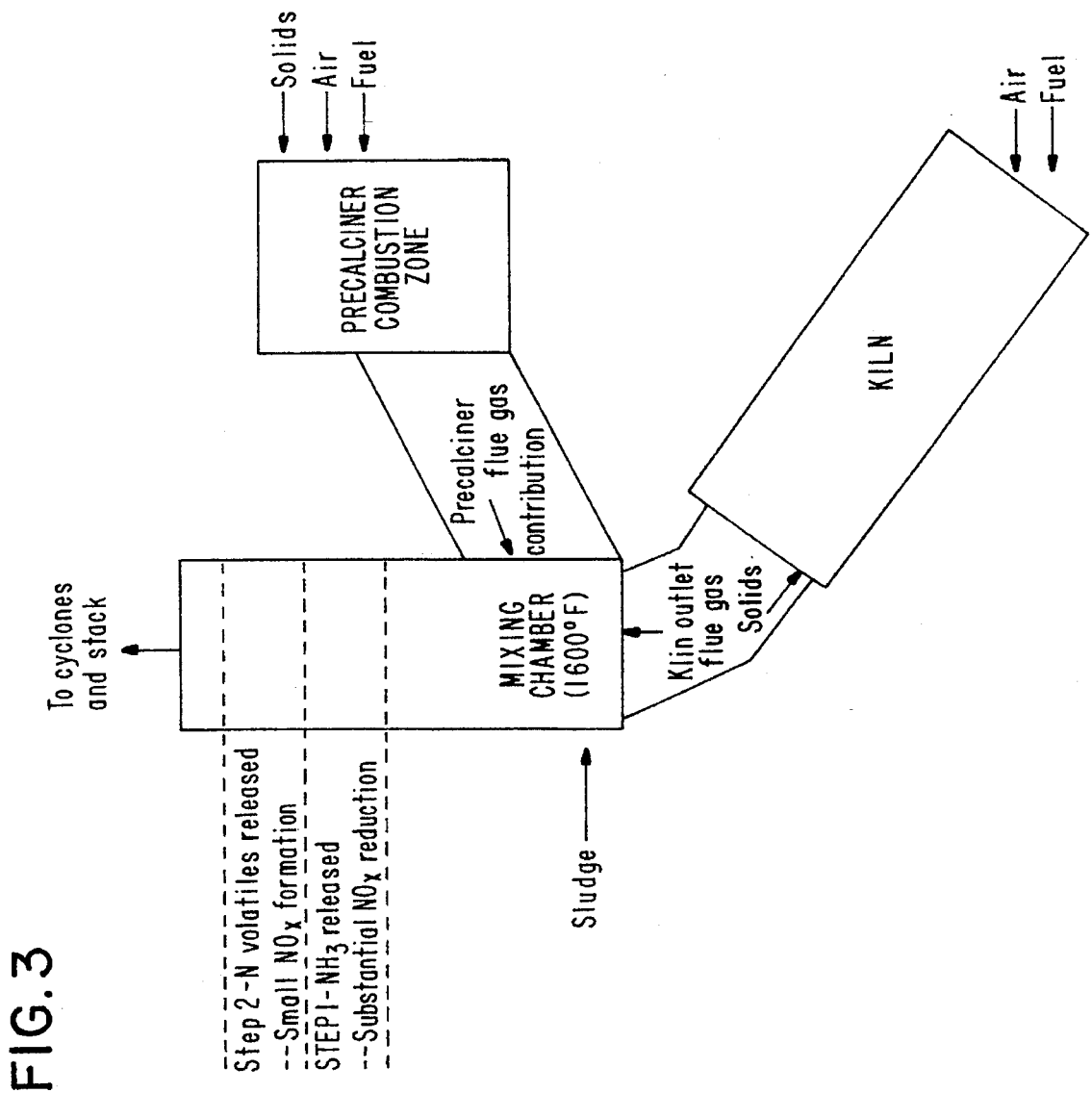
FIG. 3 presents a schematic diagram of cement kiln location for sewage sludge introduction, which should be in the mixing chamber or precalciner. The diagram indicates schematically events affecting $NO_x$ emissions after introduction of the sludge. In particular, the theoretical reactions with $NH_3$ and N volatiles that affect $NO_x$ production are noted in the figure.

Accordingly, referring now to FIG. 2, which depicts a typical cement kiln 10 and precalciner 20, in a preferred aspect of the invention, the sludge is introduced at a point in the precalciner flue gas inlet 22. More preferably, the sludge is introduced in the precalciner, downstream of the precalciner combustion zone and of the entry point of kiln outlet flue gases (FIG. 3). In this configuration, the invention advantageously provides for the reduction of pollutant emissions that result from both kiln and precalciner combustion operations. The present invention contemplates that the temperature of the flue gas at the point of introduction of the sludge is in the range of approximately 1500° F. to approximately 1800° F.; more preferably, the temperature is approximately 1700° F.

Upon introduction of the sludge into the flue gases, a series of events are expected to occur resulting in reduction of $NO_x$ emissions. Initially, the water and more importantly, ammonia present in the sludge are released. The ammonia released in this step combines with NO and oxygen to produce molecular nitrogen and water. This is the point of substantial reduction in the $NO_x$ levels in the gases. After the initial release of ammonia and water, volatile nitrogens, including ammonia present in the solid particles of sludge are released. The volatile nitrogen reaction is one that results in a small amount of $NO_x$ formation. The overall effect of the process is a substantial reduction in $NO_x$ emissions, in additional to elimination of the sludge. The reaction is summarized in FIG. 4.

Ammonia released upon introduction of the sludge can also effect a reduction in HCl emissions. The sludge $NH_3$ slip from the reaction between sludge $NH_3$ and $NO_x$s can react with HCl in the baghouse to form $NH_4Cl$, thus neutralizing the HCl. Neutralizing HCl in this fashion avoids the need to use a wet scrubber to reduce HCl emissions.

As pointed out above, reduction of pollutant emissions in the flue gases depends primarily on release of ammonia from the sludge. A particular advantage of the present invention, therefore, is that the ammonia content of the sludge is high, and at the same time the sludge provides energy.

Figure 5:
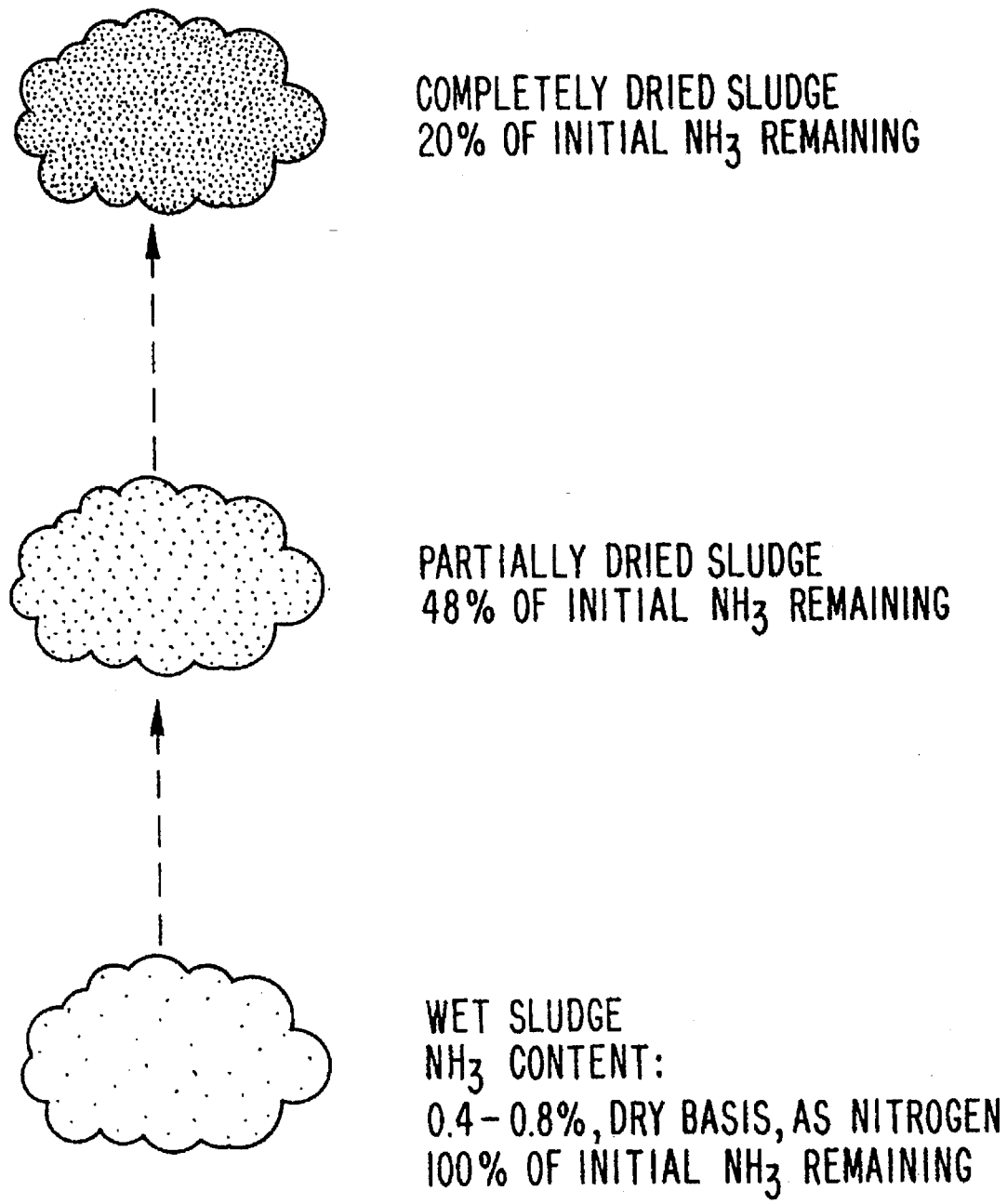
FIG. 5 presents a schematic diagram for $NH_3$ release from a particle of sludge introduced into the kiln.

Wet sludge contains 100% of the ammonia present in the sludge (FIG. 5). Based on a model system, it is expected that after the sludge particle partially dries at the high temperatures of the kiln, approximately 48% of the initial ammonia remains. Thus, it is clearly an advantage of the present invention that all of the ammonia present in the sludge is available for reaction in the flue gases to reduce $NO_x$ and HCl emissions.

Figure 6:
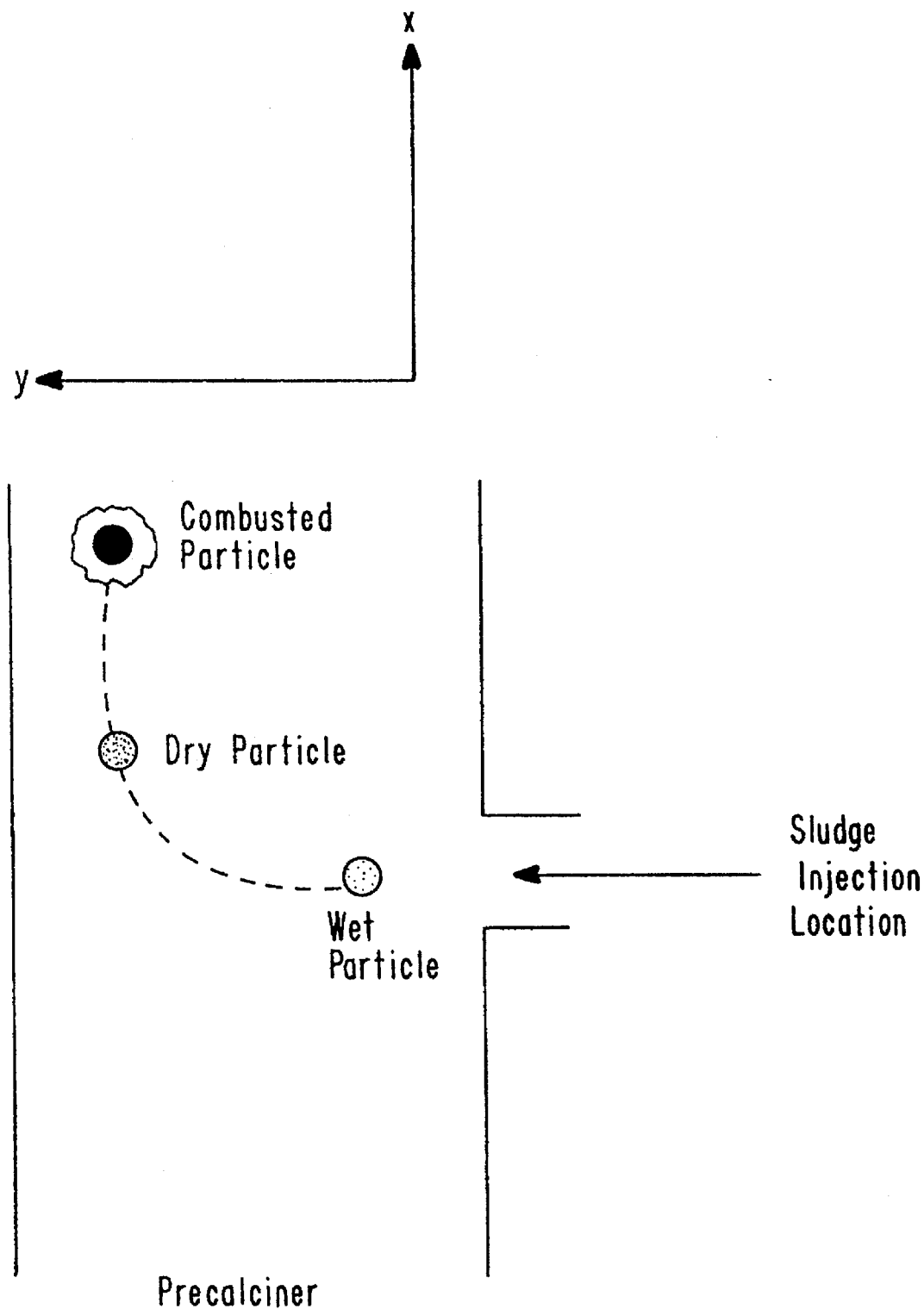
FIG. 6 presents a diagram of sludge particle behavior after introduction into the precalciner of a cement kiln. Horizontal movement proceeds along a vector in the y direction; vertical movement proceeds along a vector in the x direction. Movement of the particle in the x direction is a function of particle size, and in the y direction is a function of injection velocity. Drying of the aqueous particle occurs after injection into the kiln.

FIG. 6 provides a schematic diagram for the behavior of sludge particles introduced into the kiln. The wet sludge is injected into the appropriate site in the combustion operation. As can be readily appreciated, there is a substantial flow of combustion gases in an upward direction. Thus, there are two component vectors to the motion of each sludge particle; vertical motion in the X direction, which depends on the velocity of flue gases, and horizontal velocity in the Y direction, which depends on the velocity at which the sludge is injected. Each particle of sludge will have a drying time that depends on the particle size. The drying time in turn effects the length of time during which the particle will be subject to the forces in the X and Y directions. The longer the drying time, the farther the distance traveled in each direction. The particle size of the sludge is selected to meet the requirements for particle carryover, particle drying time, and particle penetration necessary to most efficiently effect pollutant reduction in the flue gases.

The amount of sludge introduced in the system is determinative of the extent of $NO_x$ emission reduction. The more sludge introduced, the greater the reduction in $NO_x$ emissions expected. However, too much sludge can overload the combustion system. The actual amount of sludge to be introduced will depend on the characteristics of the kiln, e.g., the type of kiln, size of the kiln, amount and type of fuel used to fire the kiln, etc., as discussed above. The amount of sludge to be introduced can be varied in order to optimize reduction in the levels of pollutant emissions.

According to the present invention, a sludge injection rate of greater than approximately 5000 to approximately 10,000 lb/hr calculated on a dry weight basis, is expected to provide for approximately a 15–30% reduction in $NO_x$ emissions in a cement kiln having the parameters shown in Table 1.

Since the present invention envisions that ammonia release will primarily accompany drying, and precede nitrogen volatile release, the ammonia in the flue gas will be present before the nitrogen volatiles that can be used in the formation of $NO_x$.

Figure 7:
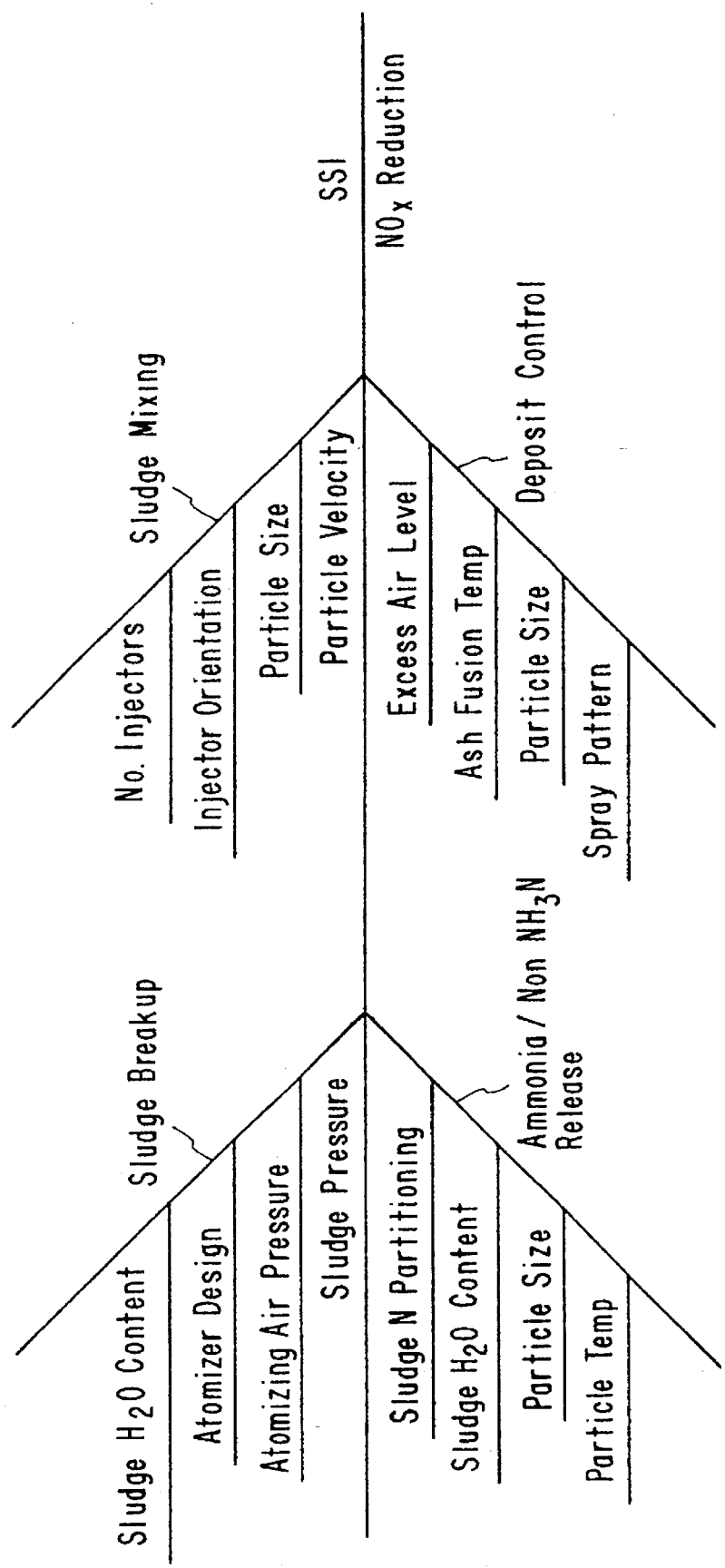
FIG. 7 presents a schematic diagram of the parameters involved in decreasing $NO_x$ emissions in the cement kiln outlet gasses.

Key parameters involved in the reduction of $NO_x$ emissions from the flue gases, and disposal of the sludge, are summarized in FIG. 7. Sludge mixing depends on the water content of the sludge and the characteristics of the particle formation system, such as sludge pressure, atomizer air pressure and atomizer design. Release of $NH_3$ from the sludge is affected by particle size and temperature, as well as partitioning of nitrogens in the sludge and sludge water content. Sludge breakup into particles is affected by the number of injectors and their orientation. The size and velocity of particles also affect sludge breakup. Finally, control of particle deposit in the combustion process is determined by air level and ash fusion temperature in addition to particle size and spray pattern.

The handling and feeding of sludge into the processing stream where it will be effective to produce $NO_x$ and HCl emission reduction can be according to any desired means. In a specific aspect of the invention, the sludge can be introduced into a precalciner as shown in FIG. 8, which diagrams a dual feed operation in which two identical systems introduce sludge into the precalciner. In one exemplary system, the sludge can be moved from a 25 ton hopper truck 30 into a feed hopper 34. A screw feeder 36 can transfer the sludge to a sludge pump 38 operated by a hydraulic drive 40 powered with a 75 horsepower motor 42. Preferably, water is injected through an injector 44 into the sludge pumped out of the sludge pump to provide lubrication. More preferably, a metering pump 46 is installed to control the rate of injection of water. In a specific aspect, the water is injected at a rate of about 24 gallons per hour. In this specific embodiment, the sludge is pumped from the sludge pump through an 8 inch pipe 48 at a rate of approximately 40–80 gallons per minute of wet sludge containing approximately 25% solids into a second sludge hopper 50. The sludge reaches a dual-fluid atomizer 52 pressurized with 200 SCFM 100 PSIG air fed from a compressor 54 through a ball valve 56. Pressure can be monitored with a gauge 58. Thus the sludge is introduced in particulate form into the precalciner mixing chamber 20.

As noted above, the net heating value of sludge is positive, resulting in a decrease in fuel consumption. For a sludge injection rate of 10,000 lb/hr dry (75% moisture content), there is a 3–6% decrease in fuel consumption.

The potential energy contribution of the sludge is partly offset by the loss in energy with evaporation. Also, the additional water volume in the flue gas that accompanies moist sludge injection requires increased fan power consumption where a fan is used to exhaust flue gases. In the particular embodiment described above, where the injection rate of sludge is 10,000 lb/hr dry (75% moisture content), there is a 5–10% increase in fan power consumption, which nevertheless is more than offset by the net positive energy value of the sludge.

In a specific aspect of the invention, the net revenue from sludge, after the sludge transport costs have been subtracted, is greater than $10.00 per ton of wet sludge, as calculated in 1993 dollars. For an injection rate of 20 tons per hour of wet sludge, estimating 8,000 operating hours per year, this represents annual revenues from sludge elimination in excess of $1,600,000.00 per year. Of course, higher sludge utilization rates would result in greater revenues. The foregoing estimates are based on the particular kiln parameters shown in Table 1. As one of ordinary skill in the art can appreciate, these conclusions will vary depending on the specific assumptions or characteristics of the kiln in process in a given embodiment of the invention. Thus, the foregoing are provided by way of example and not by way of limitation.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

Various publications are cited herein, the disclosures of which are incorporated by reference in their entireties.

What is claimed is:

1. A process for reducing pollutant emissions from a combustion operation comprising introducing particles of aqueous sludge at a point in a flue gas outlet of a combustion operation wherein a temperature is approximately 1500° F. to approximately 1800° F., and wherein the sludge introduced in the combustion operation contains an amount of ammonia effective to reduce $NO_x$ emissions, whereby pollutant emissions in outlet flue gases produced by the combustion operation are reduced.

2. The process according to claim 1 wherein the sludge comprises at least about 65% to about 70% water, and not more than about 80% to about 85% water by weight.

3. The process according to claim 2 wherein the sludge comprises between about 70% and about 80% water by weight.

4. The process according to claim 1 wherein the pollutant is selected from the group consisting of $NO_x$ and HCl.

5. The process according to claim 1, wherein the pollutant is $NO_x$, and the sludge is introduced at a rate which results in reduction of greater than 10% of emissions of $NO_x$.

6. The process according to claim 5 wherein the sludge is introduced at a rate which results in reduction of approximately 30% of emissions of $NO_x$.

7. The process according to claim 1 wherein the combustion operation is a cement manufacturing operation having a kiln and a precalciner associated with the kiln, and the sludge is introduced in a precalciner flue gas outlet downstream of a precalciner combustion zone and at a point where kiln outlet flue gases and precalciner flue gases are mixed.

8. The process according to claim 1 wherein the particle size of the sludge is optimal for reduction of pollutant emissions.

9. The process according to claim 1 wherein the sludge comprises between about 0.4% and about 1.5% $NH_3$ by weight, calculated on a dry basis, as nitrogen, and the ratio of non-$NH_3$ to $NH_3$ nitrogen by weight is approximately 1.5 to approximately 12.0.

10. The process according to claim 1 wherein the temperature at the point at which the sludge is introduced is approximately 1700° F.

11. A process for reducing pollutant emissions in a cement kiln comprising introducing particles of aqueous sludge comprising at least about 65% to about 70% water, and not more than about 80% to about 85% water by weight, in a precalciner flue gas outlet downstream of a precalciner combustion zone and at a point where kiln outlet flue gases and precalciner flue gases are mixed, wherein the sludge is introduced at a rate which results in reduction of greater than 10% of emissions of $NO_x$.

12. The process according to claim 11 wherein the temperature in the precalciner flue gas outlet is approximately 1500° F. to approximately 1800° F.

13. A combustion operation apparatus adapted for combustion of aqueous sludge resulting in reduction of $NO_x$ emissions, comprising:

(a) a combustion operation having a flue gas outlet;

(b) means for introducing particles of aqueous sludge into the combustion operation at a point in the flue gas outlet wherein a temperature is approximately 1500° F. to approximately 1800° F., wherein the sludge introduced in the combustion operation contains an amount of ammonia effective to reduce $NO_x$ emissions, whereby pollutant emissions produced by the combustion operation reduced.

14. The combustion operation apparatus of claim 13 which is a modified cement kiln.

15. The combustion operation apparatus of claim 14 wherein the means for introducing particles of aqueous sludge is located in a precalciner flue gas outlet downstream of a precalciner combustion zone and at a point where kiln outlet flue gases and precalciner flue gases are mixed.

16. The combustion operation apparatus of claim 15 wherein the temperature at the point of introduction of the sludge is approximately 1700° F.

17. The combustion operation apparatus of claim 13 wherein the means for introducing particles of aqueous sludge comprise an atomization system located at the point at which the particles of sludge are introduced.

18. The combustion operation apparatus of claim 17 wherein the means for introducing particles of aqueous sludge further comprise pumping means in fluid communication with the atomization system, which pumping means transfer the sludge to the atomization system.

19. The combustion operation apparatus of claim 18 wherein the means for introducing particles of aqueous sludge further comprise means for introducing water into the sludge, whereby the water lubricates the sludge.

20. The combustion operation apparatus of claim 13 wherein the means for introducing particles of aqueous sludge introduce approximately 40 to approximately 80 gallons per minute of aqueous sludge.

* * * * *